(12) United States Patent
Cordier

(10) Patent No.: US 10,938,107 B2
(45) Date of Patent: Mar. 2, 2021

(54) CIRCUIT AND METHOD FOR DRIVING AN ANTENNA OF AN NFC DEVICE

(71) Applicant: STMicroelectronics (Rousset) SAS, Rousset (FR)

(72) Inventor: Nicolas Cordier, Aix-en-Provence (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 281 days.

(21) Appl. No.: 16/114,994

(22) Filed: Aug. 28, 2018

(65) Prior Publication Data

US 2019/0067818 A1 Feb. 28, 2019

(30) Foreign Application Priority Data

Aug. 31, 2017 (FR) ...................... 17 58042

(51) Int. Cl.
| | |
|---|---|
| *H04B 7/00* | (2006.01) |
| *H04B 5/00* | (2006.01) |
| *H01Q 7/00* | (2006.01) |
| *H04B 5/02* | (2006.01) |
| *G06K 7/10* | (2006.01) |
| *H01Q 1/22* | (2006.01) |
| *H01Q 9/04* | (2006.01) |

(52) U.S. Cl.
CPC ......... *H01Q 7/005* (2013.01); *G06K 7/10237* (2013.01); *H01Q 1/2225* (2013.01); *H01Q 9/045* (2013.01); *H01Q 9/0442* (2013.01); *H04B 5/0075* (2013.01); *H04B 5/02* (2013.01)

(58) Field of Classification Search
CPC .... H04W 4/80; H04W 12/00404; H04B 5/00; H04B 5/0025; H04B 5/0031; H04B 5/0056; H04B 5/0062; H04B 5/0068; H04B 5/0081; H04B 5/02; H04M 1/7253; H04M 2250/04; H04M 2250/14; H01Q 1/2216; H01Q 1/2225; H01Q 7/00
See application file for complete search history.

(56) References Cited

U.S. PATENT DOCUMENTS

| | | | | |
|---|---|---|---|---|
| 8,934,836 | B2 * | 1/2015 | Lefley | H04B 5/0075 |
| | | | | 455/41.1 |
| 9,002,264 | B2 * | 4/2015 | Zhang | H04B 5/0031 |
| | | | | 455/41.1 |
| 9,071,289 | B2 * | 6/2015 | McFarthing | H04B 5/0075 |
| 9,112,543 | B2 * | 8/2015 | McFarthing | H04B 5/0031 |
| 9,385,415 | B2 * | 7/2016 | Roh | H01Q 1/2225 |
| 10,361,474 | B2 * | 7/2019 | Ding | H01Q 1/2216 |
| 2015/0178526 | A1 | 6/2015 | Roh et al. | |
| 2015/0347892 | A1 | 12/2015 | Kunc et al. | |

FOREIGN PATENT DOCUMENTS

| | | |
|---|---|---|
| EP | 2830228 A1 | 1/2015 |
| WO | 2010132031 A1 | 11/2010 |

* cited by examiner

*Primary Examiner* — Quochien B Vuong
(74) *Attorney, Agent, or Firm* — Slater Matsil, LLP

(57) ABSTRACT

A circuit for driving an antenna of near field communication (NFC) device, includes: a first variable resistor coupled to a first terminal of the antenna via a first capacitor; a second variable resistor coupled to a second terminal of the antenna via a second capacitor; and a control circuit configured to cause the first variable resistor and the second variable resistor to each have a selected one of a first resistance level, a second resistance level, and a third resistance level based on an operating phase of the circuit.

17 Claims, 5 Drawing Sheets

CIRCUIT AND METHOD FOR DRIVING AN ANTENNA OF AN NFC DEVICE

CROSS-REFERENCE TO RELATED APPLICATIONS

This application claims priority to French Patent Application No. 1758042, filed on Aug. 31, 2017, which application is hereby incorporated herein by reference.

TECHNICAL FIELD

The present disclosure relates to the field of near field communications (NFC) devices, and in particular to a circuit and method for driving an antenna of an NFC device.

BACKGROUND

Mobile telephones and other types of mobile devices are increasingly being equipped with NFC interfaces, which enable them to perform electromagnetic transponder functions in addition to their other functions. In particular, such devices are able to emulate the functions of an electromagnetic transponder, which could be of the contactless card type (known as "card emulation mode"), or the contactless reader type (known as "reader mode"). Such functionality for example enhances the mobile device by allowing it to be used for various applications, for example as an electronic wallet allowing payments to be made for accessing services such as transport networks.

To emulate the operation of a contactless card, the mobile device is generally equipped with a contactless front-end integrated circuit (CLF), also called an NFC router. This router is equipped with a radio frequency (RF) transceiver front-end coupled to a low-range antenna to match the communication capabilities of an electromagnetic transponder.

In card emulation mode, it is generally required that the resonant frequency of the antenna falls within a relatively limited frequency range. However, the various mechanical tolerances of the components of the antenna and of the antenna inductance itself lead to an overall tolerance of the resonant frequency that may cause this frequency to fall outside the required frequency range.

While some solutions exist for tuning the resonant frequency of an NFC antenna after manufacture, they tend to add significant surface area, complexity and/or cost to the circuit. There is thus a need in the art for an alternative solution for tuning the resonant frequency of an NFC antenna, and for driving an NFC antenna to achieve a desired resonant frequency.

SUMMARY

According to one aspect, there is provided an active load modulation (ALM) driving circuit for driving an NFC antenna of an NFC device, the ALM driving circuit including: a first variable resistor coupled to a first terminal of the NFC antenna via a first capacitor; a second variable resistor coupled to a second terminal of the NFC antenna via a second capacitor; and a control circuit adapted or configured to program the first and second variable resistors to each have a selected one of first, second and third resistance levels, the control circuit selecting one of the first, second and third resistance levels based on an operating phase of the NFC circuit.

According to one embodiment, the first and second variable resistors are configured such that the first resistance level causes the NFC antenna to have a first resonant frequency, and the second resistance level causes the NFC antenna to have a second resonant frequency higher than the first resonant frequency.

According to one embodiment, the first and second variable resistors are configured such that the first resonant frequency is less than 14 MHz, and the second resonant frequency is greater than 14 MHz.

According to one embodiment, the first and second variable resistors are configured such that the third resistance level causes damping of oscillations of the NFC antenna.

According to one embodiment, the first resistance level is less than 3 ohms; the second resistance level is greater than 3 ohms and less than 100 ohms; and the third resistance level is greater than 25 ohms and is different to the second resistance level.

According to one embodiment, the control circuit is adapted: to select the first resistance level during a first operating phase of the NFC device corresponding to a reader mode; to select the second resistance level during a second operating phase of the NFC device corresponding to periods of transmission bursts of the NFC antenna during a card emulation mode of the NFC device; and to select the third resistance level during a third operating phase of the NFC device corresponding to part of a non-transmission period between transmission bursts of the NFC antenna during the card emulation mode.

According to one embodiment, the control circuit is further configured to perform an automatic antenna tuning procedure to determine the value of a control signal for programming the first and second variable resistors to have the second resistance level.

According to one embodiment, the control circuit is configured to determine the control signal by performing the operations of: a) selecting an initial value of the control signal to program an initial resistance level of the first and second variable resistors; b) detecting the amplitude and/or phase of a signal present on the NFC antenna during a transmission burst; c) comparing the detected amplitude with a reference amplitude and/or comparing the detected phase with a reference phase; d) modifying the initial value of the control signal to modify the initial resistance level based on the comparison; and e) repeating the operations b) to d) one or more times.

According to a further aspect, there is provided an NFC device including: an NFC antenna; the above-described ALM driving circuit coupled to the NFC antenna; and a battery supplying a supply voltage to the ALM driving circuit.

According to one embodiment, the NFC device further includes a host processing device in communication with the ALM driving circuit.

According to a further aspect, there is provided a method of driving an NFC (near field communications) antenna of an NFC device using an active load modulation driving circuit, the method including: generating, by a control circuit, at least one control signal for programming first and second variable resistors to each have one of first, second and third resistance levels selected based on an operating phase of the NFC circuit, the first variable resistor being coupled to a first terminal of the NFC antenna via a first capacitor and the second variable resistor being coupled to a second terminal of the NFC antenna via a second capacitor; and applying, by the control circuit, the at least one control signal to the first and second variable resistors.

According to one embodiment, the at least one control signal is generated in order to program the first and second variable resistors: to select the first resistance level during a first operating phase of the NFC device corresponding to a reader mode; to select the second resistance level during a second operating phase of the NFC device corresponding to periods of transmission bursts of the NFC antenna during a card emulation mode of the NFC device; and to select the third resistance level during a third operating phase of the NFC device corresponding to part of a non-transmission period between transmission bursts of the NFC antenna during the card emulation mode.

According to one embodiment, the method further includes performing an automatic antenna tuning procedure to determine the value of the second control signal.

According to one embodiment, the automatic antenna tuning procedure includes: a) selecting, using an initial control signal value, an initial resistance level of the first and second variable resistors; b) detecting the amplitude and/or phase of a signal present on the NFC antenna during a transmission burst; c) comparing the detected amplitude with a reference amplitude and/or comparing the detected phase with a reference phase; d) modifying the initial control signal value to modify the initial resistance level based on the comparison; and e) repeating the operations b) to d) one or more times and storing the modified initial control signal value.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION OF ILLUSTRATIVE EMBODIMENTS

Throughout the present description, the term "connected" is used to designate a direct electrical connection between circuit components, while the term "coupled" is used to designate an electrical connection between circuit components that may be direct, or may be via one or more intermediate components such as resistors, capacitors, transistors, etc. The term "around" implies a range of plus or minus 10% of the value in question.

Figure 1:
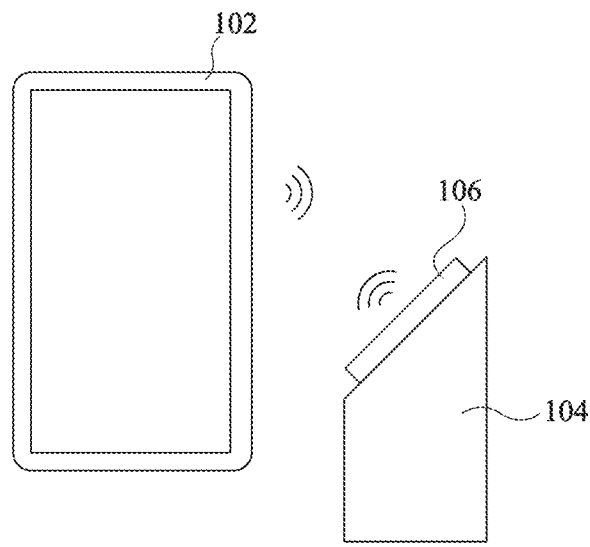
FIG. 1 schematically illustrates an NFC device capable of NFC communications according to an example embodiment of the present disclosure.

FIG. 1 schematically illustrates an NFC device 102, which is a device capable of NFC communications. For example, the device 102 is a mobile device, such as a mobile telephone, smart phone, tablet computer, digital media player or the like, equipped with NFC circuitry (not illustrated in FIG. 1).

The NFC device 102 is shown in communication with a reader 104, including an NFC transponder 106. For example, the reader 104 is positioned at an entry barrier of a restricted area, such as a transport network or the like. Alternatively, the reader 104 is positioned at a point of sale in a shop or restaurant. When used with such a reader, the NFC circuitry of the NFC device 102 for example operates in a tag emulation mode.

Figure 2:
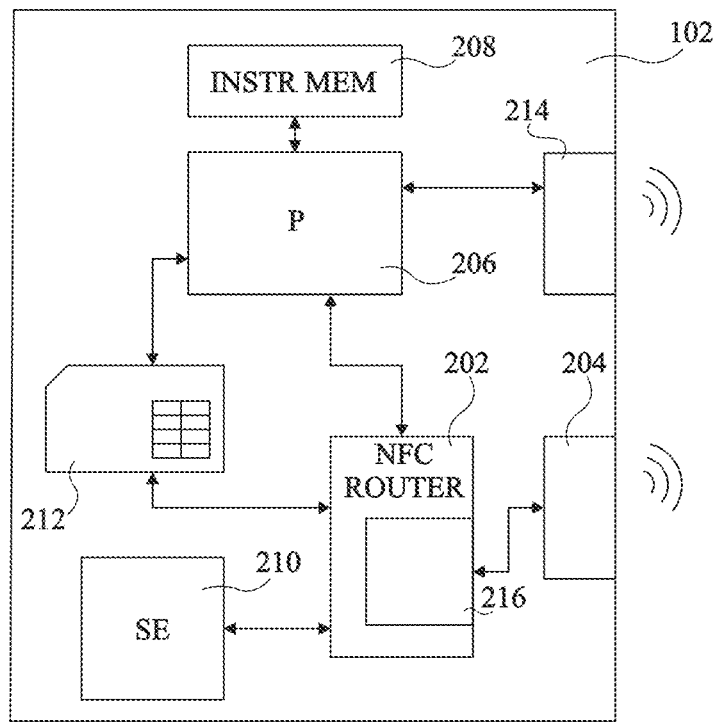
FIG. 2 schematically illustrates the NFC device of FIG. 1 in more detail according to an example embodiment of the present disclosure.

FIG. 2 schematically illustrates the NFC device 102 in more detail according to an example embodiment.

As illustrated, the device 102 for example includes an NFC router 202, also known in the art as a contactless front-end (CLF). The NFC router 202 is coupled to an NFC antenna circuit 204, and together the router 202 and antenna circuit 204 provide NFC circuitry for emulating the behaviour of an NFC transponder.

The NFC router 202 is also coupled to a host processing device 206 of the NFC device 102. The device 206 includes one or more processors under the control of instructions stored in an instruction memory 208. The instruction memory 208 is for example a Flash memory, and stores one or more applications (not illustrated in FIG. 2) that have been loaded on the device. The NFC router 202 is also coupled to other devices, of which a secure element 210 and Universal Subscriber Identification Module (USIM) circuit 212 are illustrated. The secure element 210 is an embedded SE (eSE) coupled to the NFC router via a single wire protocol (SWP) link, and the USIM circuit 212 is for example a universal integrated circuit card (UICC) coupled to the NFC router via an SWP link, and is additionally coupled to the host processing device 206. While not illustrated in FIG. 2, there may be further secure elements such as one or more micro secure digital (µSD) cards.

The host processing device 206 is also coupled to one or more antennas 214, which permit telecommunications within a cellular network, and/or wireless communications according to other standards such as Wi-Fi, Bluetooth etc.

The NFC antenna circuit 204 includes an NFC antenna, and interface circuitry (not illustrated in FIG. 2) providing frequency matching, input/output interfaces, etc. The NFC router 202 includes an active load modulation (ALM) driving circuit 216 for driving the NFC antenna circuit 204. The driving circuit 216 provides modulated data to the circuit 204 for transmission, and receives, from the circuit 204, RF signals received via the NFC wireless interface.

The NFC router 202, including the driving circuit 216, are for example supplied by a power supply such as a battery (not illustrated) of the NFC device.

Figure 3:
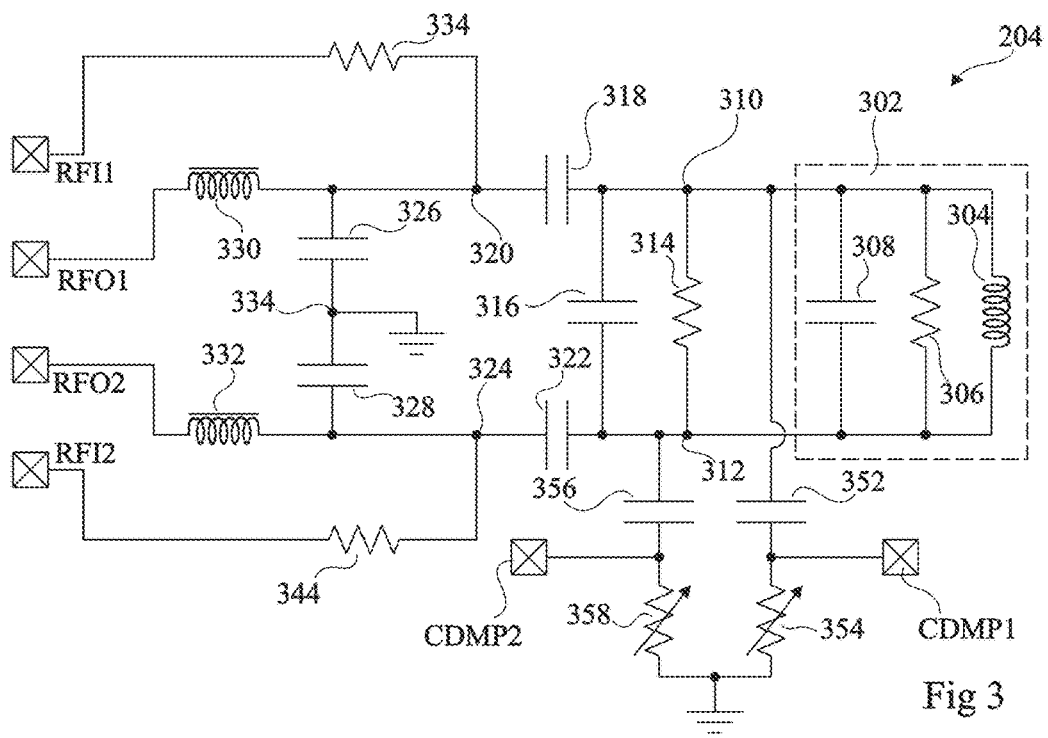
FIG. 3 schematically illustrates an example of an NFC antenna and interface circuit of the NFC antenna.

FIG. 3 schematically illustrates the NFC antenna circuit 204 of FIG. 2 in more detail according a typical example.

The circuit 204 of FIG. 3 includes an NFC antenna 302, represented by an RLC model formed of the parallel connection of an inductor 304, a resistor 306 and a capacitance 308, coupled between differential input/output terminals 310, 312 of the antenna. The circuit 204 of FIG. 3 also includes an antenna interface positioned between the antenna terminals 310, 312 and terminals RFI1, RFI2, RFO1 and RFO2 of the antenna driving circuit (not illustrated in FIG. 3). In particular, the terminals 310, 312 of the antenna are coupled to a matching circuit including a resistor 314 and capacitor 316 coupled in parallel between the terminals 310, 312, a capacitor 318 coupling the terminal 310 to a node 320 and a capacitor 322 coupling the terminal 312 to a node 324. The nodes 320 and 324 are for example respectively coupled to RF output terminals RFO1, RFO2 of the driving circuit via an electromagnetic interference (EMI) filter formed by a pair of capacitors 326, 328 and a pair of inductors 330, 332. The capacitors 326 and 328 are coupled in series between the nodes 320 and 324, an intermediate node 334 between the capacitors 326, 328 being coupled to ground. The inductors 330, 332 respectively couple the nodes 320, 324 to the terminals RFO1, RFO2. The circuit 204 also includes decoupling components permitting RF signals to be provided from the antenna to the driving circuit 216. For example, the node 320 is coupled to the RF input terminal RFI1 of the antenna driving circuit via a resistor 334. Similarly, the node 324 is for example coupled to the RF input terminal RFI2 of the antenna driving circuit via a resistor 344.

The circuit 204 also for example includes capacitive damping (CDMP) circuitry including the series connection of a damping capacitor 352 and a damping resistor 354 coupled between the node 310 and ground, and the series connection of a damping capacitor 356 and a damping resistor 358 coupled between the node 312 and ground. In some embodiments, the resistors 354 and 358 are integrated within the driving circuit 216, an intermediate node between capacitor 352 and resistor 354 being provided to a terminal CDMP1 of the driving circuit, and an intermediate node between capacitor 356 and resistor 358 being provided to a terminal CDMP2 of the driving circuit.

The antenna 302 for example has an inductance of around 475 nH, a capacitance of around 5 pF, and a resistance of around 1500 ohms. The capacitor 316 for example has a capacitance of around 7.5 pF, the capacitors 318 and 322 a capacitance of around 200 pF each and the resistor 316 a resistance of around 1500 ohms. The inductors 330, 332 for example each have an inductance of around 75 nH, and the capacitors 326, 328 each for example have a capacitance of around 560 pF. The resistors 334 and 344 each for example have a resistance of around 100 ohms.

In operation, during a card emulation mode, the NFC antenna circuit 204 for example operates using active load modulation (ALM). In particular, ISO/IEC 14443 defines contactless chip cards having NFC tags that operate using proximity coupling. The NFC tags transmit data to the reader using signals at a subcarrier frequency equal to an integer divider of the carrier frequency (generally equal to 13.56 MHz). According to the standard, the NFC tag is powered by the field of the reader and transmits data by applying passive load modulation to the signal of the reader. However, the operating range is limited by the coupling factor between the antennas of the reader and tag. When the contactless chip card is emulated on an NFC device having a power source such as a battery, the operating range can be considerably increased by actively generating a load modulated signal at the subcarrier frequency, and this technique is known in the art as active load modulation.

A difficulty in systems employing active load modulation is the generation, with relatively high precision, of the carrier frequency and phase during card emulation. A solution that has been proposed is an in-frame synchronization method involving locking on to the frequency of the signal received from the NFC reader during the periods between transmission bursts. The transmission bursts for example have a period equal to the period of the subcarrier signal at for example 847 MHz. Each transmission burst may cause the NFC antenna to oscillate for some time following the end of each transmission burst. Therefore, the damping capacitors 352, 356 and damping resistors 354 and 358 are coupled to the nodes 310 and 312 respectively using corresponding switches (not illustrated in FIG. 3) for short periods following each transmission burst in order to damp the antenna oscillation and permit frequency locking prior to the next transmission burst. Such a technique is for example described in more detail in the United States patent application published as US2015/0347892, entitled "Method and circuit of an actively transmitting tag," the content of which is hereby incorporated by reference to the extent permitted by the law.

In NFC antenna circuits such as that of FIG. 3, the real resonant frequency of the antenna 302 may be relatively far from the desired frequency level, whereas there is an increasing need to provide NFC antennas having a resonant frequency falling within a relatively narrow frequency band, as will now be described with reference to FIGS. 4A and 4B.

Figure 4A:
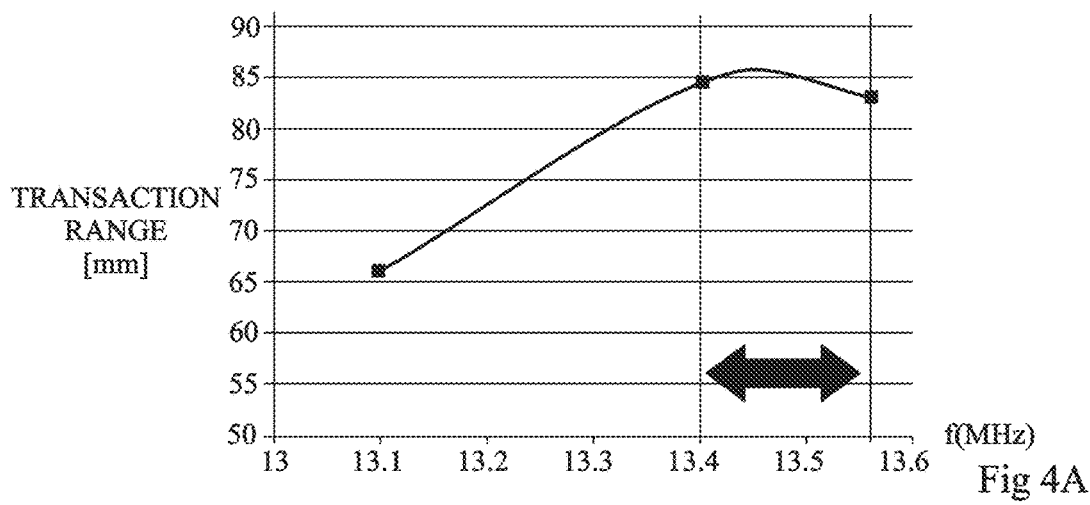
FIGS. 4A and 4B are graphs illustrating frequency characteristics of an NFC reader according to an example embodiment.
Figure 4B:
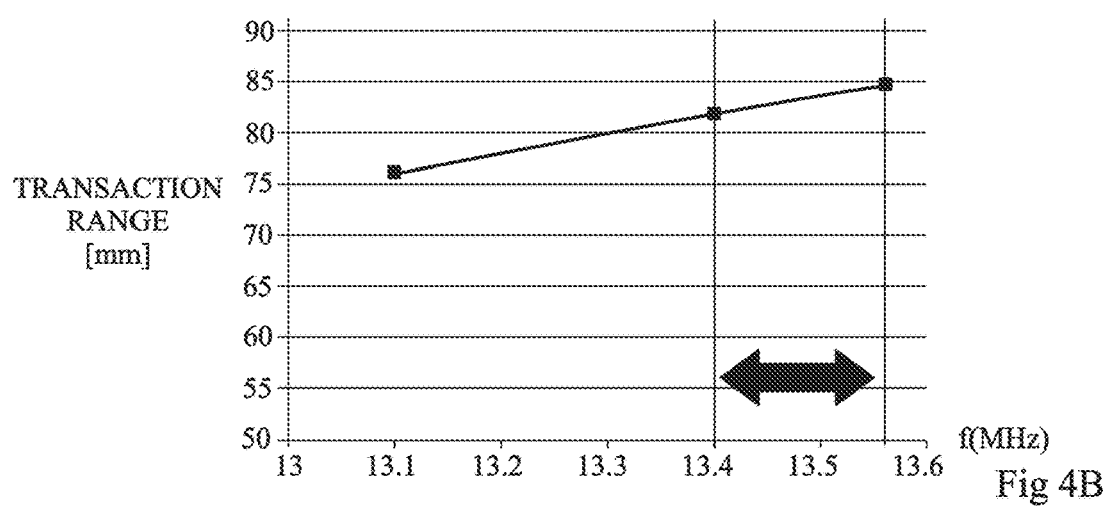

FIGS. 4A and 4B illustrate the transaction range in mm assuming an NFC reader having minimum and maximum frequencies of 13.4 and 13.8 MHz respectively. Indeed, there is an increasing need to provide NFC antennas that can communicate, with acceptable performance, with readers corresponding to a variety of different protocols, and the frequencies of these readers can vary accordingly.

In the case of FIG. 4A, assuming an acceptable transaction range of 75 mm, resonant frequencies of the NFC antenna over a relatively large frequency band from around 13.25 MHz to more than 13.56 MHz are acceptable for a reader resonant at the frequency of 13.4 MHz. However, in the case of FIG. 4B, in which the NFC reader is tuned to the frequency of 13.8 MHz, the NFC antenna should have a resonant frequency in a more restricted frequency band of between around 13.4 and 13.56 MHz, i.e. a band of around 160 kHz. However, tolerances in the inductance, capacitance, resistance, etc. of the NFC antenna, which are each of between 1 and 5%, can easily lead to a total variation in the resonant frequency of up to 500 kHz. Antenna tuning provides a mechanism for bringing the resonant frequency to within the desired frequency band. While a solution for tuning the resonant frequency could be to use variable capacitors, such solutions tend to require relatively high surface area.

Figure 5:
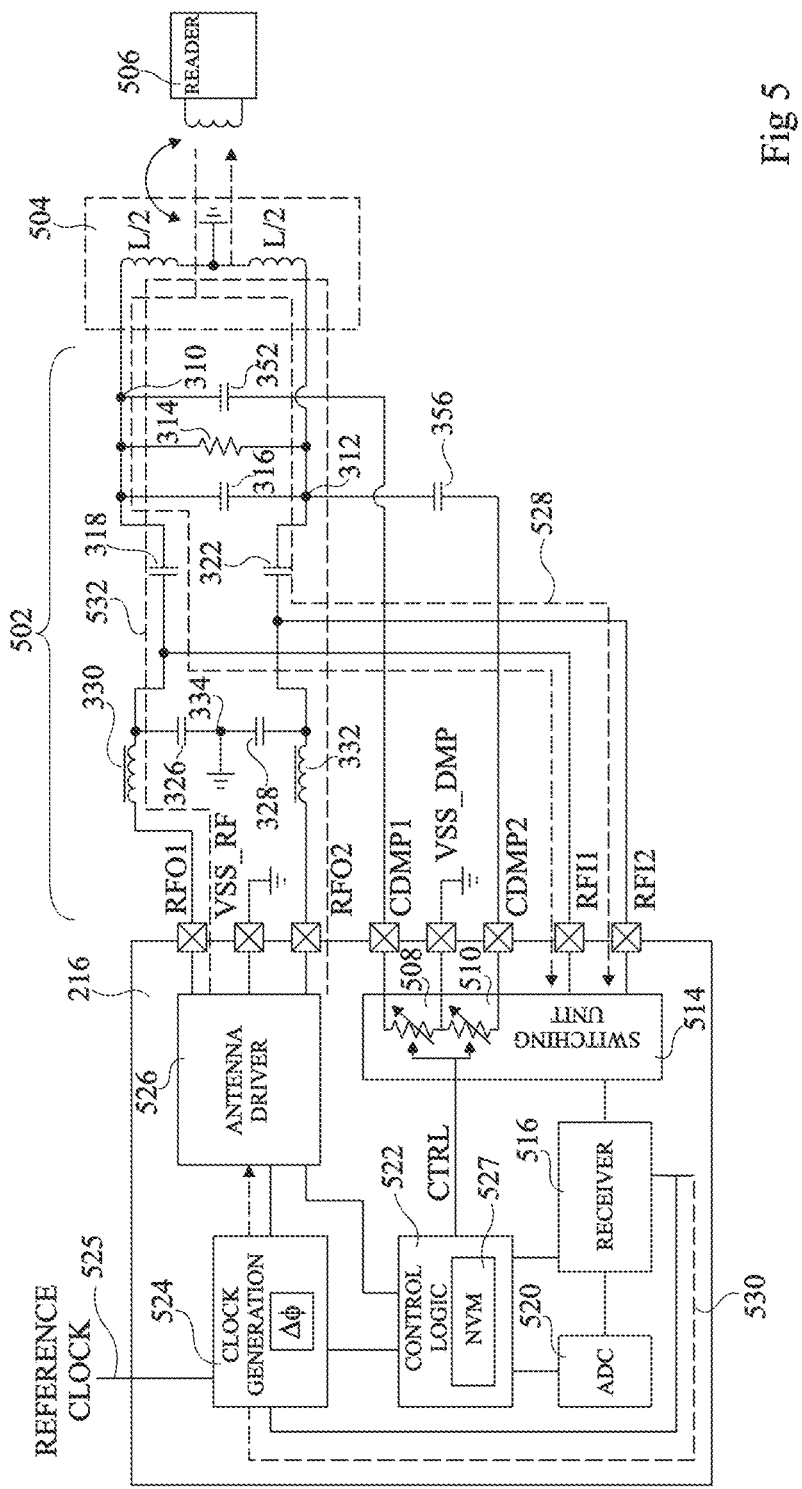
FIG. 5 schematically illustrates an NFC antenna, and interface circuit and driving circuit of the NFC antenna, according to an example embodiment of the present disclosure.

FIG. 5 schematically illustrates the antenna driving circuit 216 according to an embodiment of the present disclosure, along with an antenna interface 502 and an NFC antenna 504 in communication with an NFC reader 506.

The antenna interface 502 is, for example, similar to the interface of FIG. 3 and like features has been labelled with like reference numerals and will not be described again in detail. In the example of FIG. 5, the damping capacitors 352 and 356 are respectively coupled between the antenna terminals 310, 312 and terminals CDMP1 and CDMP2 of the antenna driving circuit 216. Within the driving circuit 216, the terminal CDMP1 is coupled to ground via a variable resistor 508, and the terminal CDMP2 is coupled to ground via a variable resistor 510. The variable resistors 508, 510 are for example controlled by a digital control signal CTRL. In the example of FIG. 5, the variable resistors 508, 510 are implemented by switches in a switching unit 514 of the antenna driving circuit 216.

The antenna driving circuit 216 also for example includes a receiver 516, an analog-to-digital converter (ADC) 520, a control circuit 522, a clock generator 524 having a reference clock input 525, and an antenna driver 526. The control circuit 522, for example, includes a programmable non-volatile memory 527 storing one or more values of the control signal CTRL, as will be described in more detail below.

During a data reception phase, the signal received via the antenna 504 is for example provided, via the RF input terminals RFI1, RFI2, to the switching unit 514. The path of this signal is represented by a dashed line 528 in FIG. 5. The switching unit 514 provides the signal received at the terminals RFI1, RFI2 to the receiver 516. The receiver 516 for example performs envelope detection to demodulate the received signal, and provides the demodulated signal to the ADC 520. The ADC 520 converts the demodulated signal into a digital signal. As described in more detail below, the ADC 520 is also for example capable of performing amplitude and phase measurements on a carrier signal emitted by the antenna 504. The ADC 520 in turn provides the resulting digital data to the control circuit 522. The control circuit 522 also for example provides data to the antenna driver 526, which for example modulates the data based on a clock signal provided by the clock generator 524, and provides, at the RF output terminals RFO1, RFO2, a transmission signal having a certain phase shift with respect to the received RF signal. The path of this signal is represented by a dashed line 532 in FIG. 5.

During a damping phase described in more detail below, the control circuit 522 for example controls the variable resistors 508, 510 to each have a resistance level D that causes damping of the signal on the antenna 504 in preparation for a frequency locking phase. For example, the resistance level D is between 50 and 500 ohms.

While the NFC device is in the card emulation mode, but not in the damping phase, the control circuit 522 for example controls the variable resistors 508, 510 to each have a resistance level R that modifies the resonant frequency of the NFC antenna to a desired frequency band. This resistance level R is for example between 3 and 100 ohms, and is for example lower than the resistance level D during the damping phase.

During a reader mode, the control circuit 522 for example controls the variable resistors 508, 510 to each have a relatively low resistance level (M) of less than 3 ohms, and for example of around 1 ohm. Furthermore, during the reader mode the clock generator 524 provides a clock signal to the antenna driver 526 generated based on the reference clock signal received at the input 525. For example, while not illustrated in FIG. 5, the reference clock is generated by a crystal oscillator or based on a system clock of the host device. In the case of a crystal oscillator, a clock signal of 27.12 MHz is for example generated by the crystal oscillator, and the clock generator 524 for example includes circuitry for halving the frequency of this clock signal to generate the carrier at 13.56 MHz. In the case of a system clock, such clock signals are typically at 19.2 or 26 MHz, and the clock generator 524 for example includes a phase locked loop (PLL) for transforming this signal into a clock signal at the carrier frequency of 13.56 MHz.

During the frequency locking phase, the receiver 516 for example extracts a clock signal from the signal received from the reader 506, and provides the extracted clock signal to the clock generator 524. The clock generator 524 generates a clock signal based on the extracted clock signal, which is provided to the antenna driver 526. The path of the extracted clock is represented by a dashed arrow 530 in FIG. 5.

Figure 6:
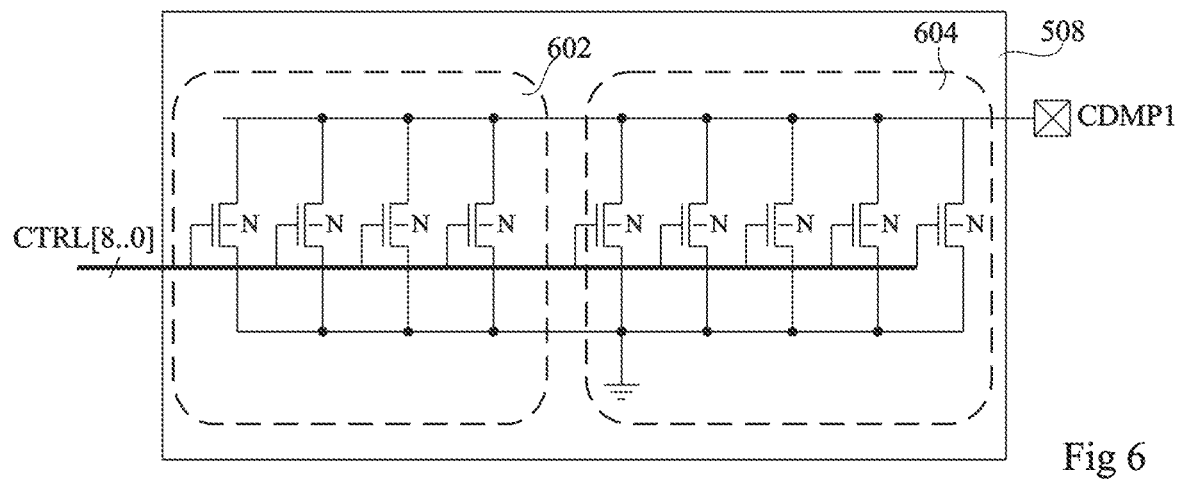
FIG. 6 schematically illustrates a variable resistor of the NFC driving circuit of FIG. 5 in more detail according to an example embodiment.

FIG. 6 schematically illustrates a circuit implementing the variable resistor 508 of FIG. 5 according to an example embodiment. The variable resistor 510 is for example implemented by a similar circuit.

The variable resistor 508 for example includes a group 602 of transistors and a further group 604 of transistors, the transistors of each of the groups 602, 604 being coupled in parallel with each other between the terminal CDMP1 and ground. Each of the transistors of the groups 602, 604 is controlled by a corresponding bit of the control signal CTRL. For example, the transistors are n-channel MOS transistors, and are activated by a high level of the corresponding bit of the control signal. Thus when the control bit to one of the transistors is low, that transistor provides a relatively high resistance path for example of several hundred ohms or more, whereas when the control bit is high, that transistor provides a relatively low resistance path equal to its ON resistance. In alternative embodiments, the transistors of the groups 602, 604 could be implemented by p-channel MOS transistors.

The transistors of the group 602 are for example activated at the same time to provide a relatively low resistance M of the variable resistor 508 during the reader mode of the NFC device. For example, when all activated, the transistors of the group 602 for example provide a combined resistance of around 1 ohm or less.

The transistors of the group 604 are activated to provide either the damping resistance level D, or the resistance level R for obtaining the desired resonant frequency of the NFC antenna. For example, the transistors of the group 604 permit a resistance to be selected over a relatively broad range, for example in a range of 3 to several hundred ohms. The transistors in the group 604 may each have a same ON resistance, or could have varying ON resistances permitting a broader range of resistances to be selected.

In the example of FIG. 6, the group 602 includes four transistors, the group 604 includes five transistors, and the control signal CTRL is a 9-bit signal, one bit controlling the gate of each transistor. However, in alternative embodiments, the group 602 could include at least one transistor, and the group 604 could include at least two transistors, and the control signal CTRL has a corresponding number of bits. Furthermore, rather than being determined only by the ON resistance of the transistors, the resistance of each path could also be determined by a fixed resistance implemented for example by a poly resistor in series with each transistor.

Figure 7:
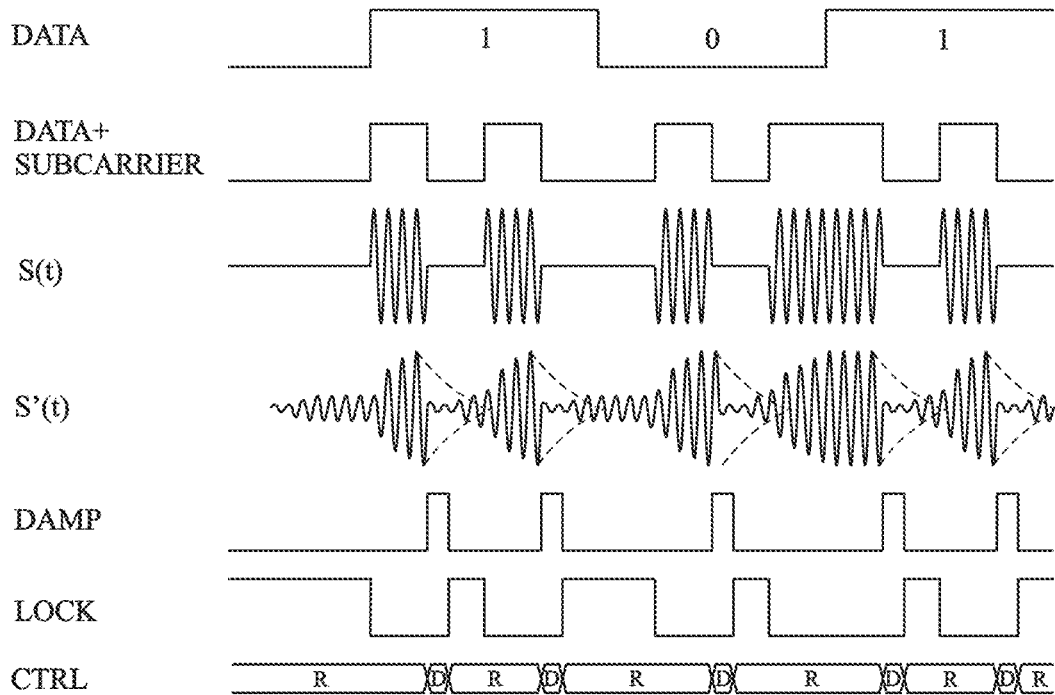
FIG. 7 is a timing diagram illustrating examples of signals in the circuit of FIG. 5 according to an example embodiment.

FIG. 7 is a timing diagram illustrating examples of a data signal DATA transmitted by the NFC antenna 504, the combination of the data signal with the subcarrier frequency, the resulting modulated RF signal S(t) applied to the antenna, the signal S'(t) present on the antenna, a signal DAMP controlling damping phases of the NFC antenna, a signal LOCK controlling frequency and phase locking phases of the NFC antenna, and the control signal CTRL.

As illustrated, the data signal is for example encoded on the subcarrier using Manchester encoding in which the phase of the subcarrier is at 0° for "1" bits and at 180° for "0" bits. Thus the signal S(t) includes bursts of the transmission frequency, equal for example to 13.56 MHz, interspaced by pauses. The signal S'(t) shows that, in view of the antenna characteristics, the amplitude with rise and fall progressively following each edge of the data and subcarrier signal. However, the pauses between transmission bursts are to be used for frequency locking, and thus damping is applied shortly after each burst, as represented by the signal DAMP. The control signal CTRL is at a value programming the resistance level D during these damping periods. However, outside of these damping periods, the control signal CTRL is at a value programming the resistance level R to adjust the resonant frequency of the NFC antenna 504 to fall within a desired frequency range.

In some embodiments, to reduce transponder loading effects during transmission bursts, the resonant frequency in card emulation mode is controlled to be higher than that of the operating frequency of the reader. For example, it is controlled to be in the range 14 to 16 MHz, and for example between 14 and 15 MHz. The resonant frequency during reader mode of the NFC device is for example controlled to be at or close to 13.56 MHz.

Figure 8:
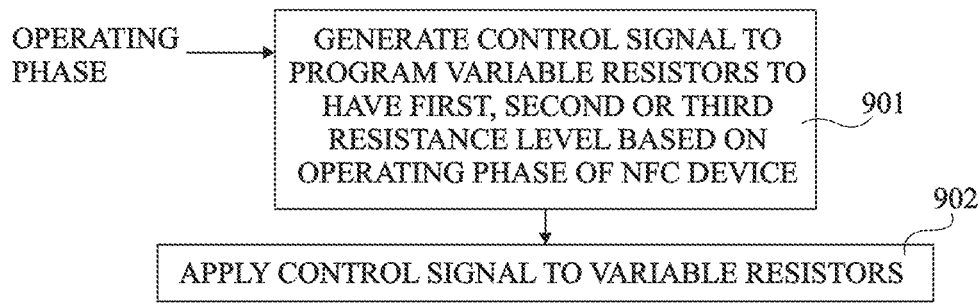
FIG. 8 is a flow diagram representing operations in a method of driving an NFC antenna according to an example embodiment of the present disclosure.

FIG. 8 is a flow diagram representing operations in a method of driving an NFC antenna using ALM according to an example embodiment of the present disclosure.

An operation 901 involves generating, by the control circuit 522, a control signal CTRL for programming the variable resistors 508, 510 to each have one of first, second and third resistance levels M, R, D selected based on an operating phase of the NFC circuit. The operating phase is for example an input parameter of the control circuit 522.

In an operation 902, the control circuit applies the generated control signal to the first and second variable resistors in order to program their resistance levels.

The resistance level R of each of the variable resistors 508, 510, and more specifically the value of the control signal CTRL to obtain a desired resonant frequency of the NFC antenna, is for example determined during an automatic tuning phase based on a detection of the amplitude and/or phase of the signal present on the NFC antenna 504, as will now be described with reference to FIGS. 9A to 9C.

Figure 9A:
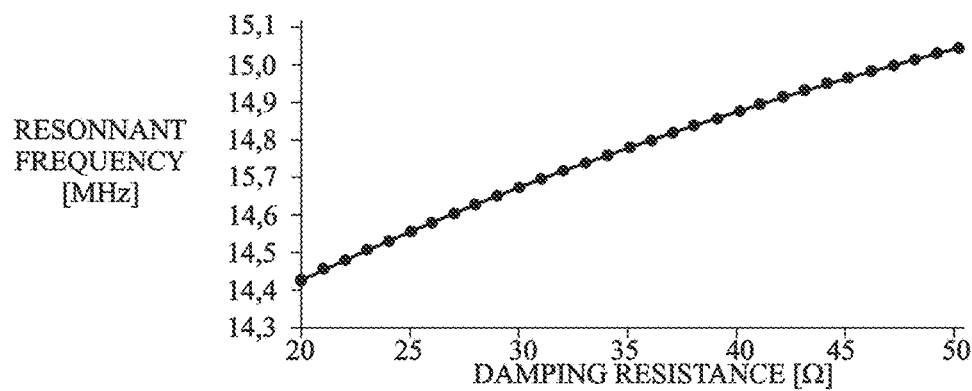
FIG. 9A is a graph representing a resonant frequency of an NFC antenna as a function of damping resistance according to an example embodiment.

FIG. 9A is a graph representing a resonant frequency of the NFC antenna 504 of FIG. 5 as a function of damping resistance according to an example embodiment. It can be seen that the resonant frequency varies relatively linearly with the damping resistance from a frequency close to 14.2 MHz for a damping resistance of 20 ohms to a frequency close to 15.05 MHz for a damping resistance of 50 ohms.

Figure 9B:
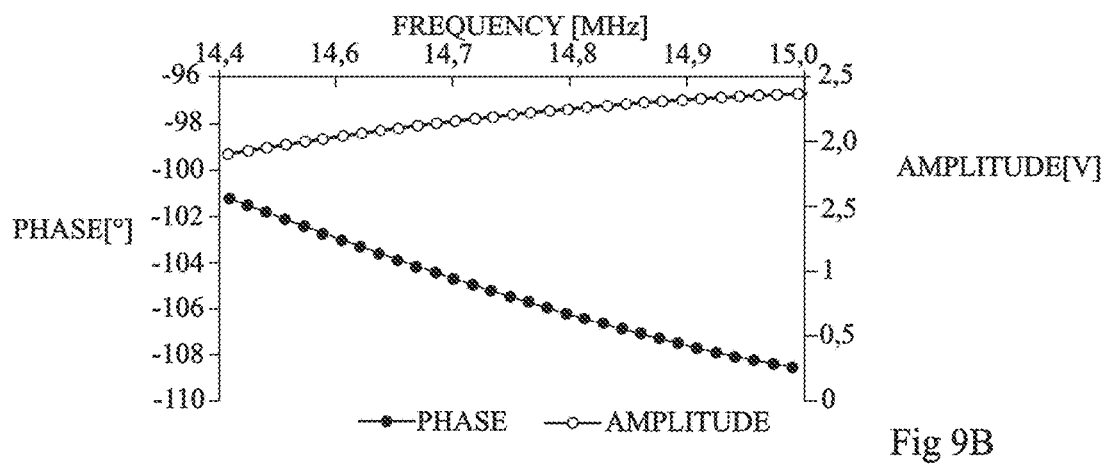
FIG. 9B is a graph representing phase and amplitude of an RF antenna signal as a function of a resonant frequency of the NFC antenna according to an example embodiment.

FIG. 9B is a graph representing phase and amplitude of an RF antenna signal as a function of a resonant frequency of the NFC antenna according to an example embodiment. It can be seen that, as the frequency increases from 14.4 to 15 MHz, the phase decreases from a level close to −101° to a level close to −108.5°, and the amplitude increases from a level of close to 1.9 V to a level close to 2.4 V.

Figure 9C:
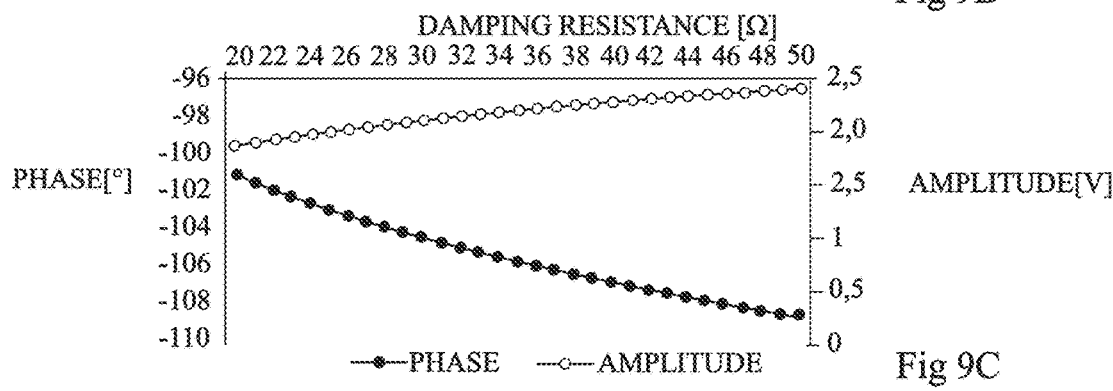
FIG. 9C is a graph representing phase and amplitude of an RF antenna signal as a function of damping resistance according to an example embodiment.

FIG. 9C is a graph representing phase and amplitude of an RF antenna signal as a function of damping resistance according to an example embodiment. It can be seen that, as the damping resistance varies from 20 to 50 ohms, the phase and amplitude vary in a similar manner to their variation when the resonant frequency was varied from 14.4 to 15 MHz.

Thus FIGS. 9A to 9C demonstrate that there is a monotonically increasing relationship between the amplitude of the RF antenna signal and the resonant frequency, and also between the amplitude of the RF antenna signal and the damping resistance. Furthermore, there is a monotonically decreasing relationship between the phase of the RF antenna signal and the resonant frequency, and also between the phase of the RF antenna signal and the damping resistance. Therefore, by knowing the amplitude and/or phase corresponding to the desired resonant frequency of the NFC antenna, and by detecting the amplitude and/or phase while a known signal is applied to the antenna, it is possible to tune the NFC antenna towards a desired resonant frequency. For example, assuming that a resonant frequency of 14.7 MHz is desired, this corresponds to an amplitude close to 2.2 V and a phase close to −105°. Therefore, by adjusting the control signal CTRL of the variable resistors 508, 510 until an amplitude close to 2.2 V and/or a phase close to −105° is achieved, the resonant frequency can be brought to the desired level. A method of performing a tuning operation of this type will now be described with reference to FIG. 10.

Figure 10:
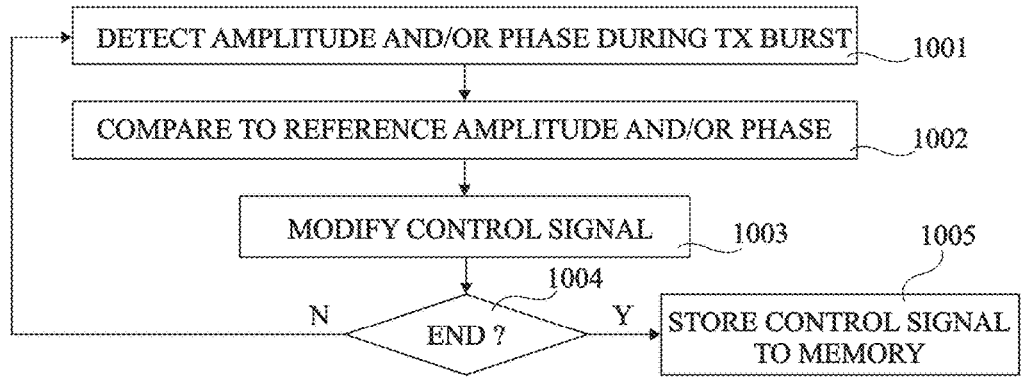
FIG. 10 is a flow diagram representing operations in a method of automatic antenna tuning of an NFC antenna according to an example embodiment.

FIG. 10 is a flow diagram representing operations in a method of automatic antenna tuning of an NFC antenna implemented by the driving circuit 216 of FIG. 5.

In an operation 1001, the amplitude and/or phase of the RF signal present on the NFC antenna is detected while a signal having a given phase and amplitude is applied to the antenna, for example during a transmission burst. For example, during the auto-calibration of the antenna, the antenna driver 526 drives the antenna based on the reference clock signal provided on the input line 525. Initially, the control signal CTRL is for example used to set the variable resistors 508, 510 at an intermediate resistance level around halfway between the maximum and minimum resistance levels of each resistor.

For example, with reference to FIG. 5, the RF signal on the antenna is received via the RF input terminals RFI1, RFI2 of the driving circuit 216, and processed by the receiver 516 and ADC 520 in order to generate a digital signal representing the RF signal present at the antenna. The ADC 520 also for example performs an amplitude and phase measurement of RF signal, and provides the resulting amplitude and phase to the control circuit 522.

In an operation 1002, the detected amplitude is compared to a reference amplitude and/or the detected phase is compared to a reference phase. The reference amplitude and reference phase correspond to the desired resonant frequency. The reference amplitude and/or reference phase are for example represented by digital values stored in the non-volatile memory 527 of the control circuit 522.

In an operation 1003, the control signal CTRL is modified based on the result of the comparison performed in operation 1002. For example, in the case that the amplitude is detected, if the detected amplitude is lower than the reference amplitude, the control signal is modified to increase the resistance of the variable resistors 508, 510, and if the detected amplitude is higher than the reference amplitude, the control signal is modified to reduce the resistance of the variables resistors 508, 510. In the case that the phase is detected, if the detected phase is lower than the reference phase, the control signal is modified to reduce the resistance of the variable resistors 508, 510, and if the detected phase is higher than the reference phase, the control signal is modified to increase the resistance of the variables resistors 508, 510.

In an operation 1004, it is determined whether the tuning operation has ended. In some embodiments, the tuning operation ends after a given number of iterations depending on the number of resistance levels that are programmable. In other embodiments, the tuning operating continues until it is detected that the control signal has stabilized to one or two values. If the tuning operation has not yet ended, the operations 1001 to 1004 are repeated. Once the tuning operation has ended, in an operation 1005, the determined final control signal is stored to memory, such as the non-volatile memory 527 of FIG. 5.

An advantage of the embodiments described herein is that the resonant frequency of an NFC antenna can be controlled in a relatively simple manner using variable resistors that also serve the purpose of providing damping before frequency locking phases. Thus frequency tuning can be provided with relatively little increase in surface area.

Having thus described at least one illustrative embodiment, various alterations, modifications and improvements will readily occur to those skilled in the art. For example, while some particular examples of algorithms have been described in relation with FIG. 10 for determining a resistor control signal for obtaining a desired resonant frequency, it will be apparent to those skilled in the art that other algorithms could be used, such as a brute force approach.

What is claimed is:

1. A circuit for driving an antenna of a near field communication (NFC) device, the circuit comprising:
   a first variable resistor coupled to a first terminal of the antenna via a first capacitor;
   a second variable resistor coupled to a second terminal of the antenna via a second capacitor; and
   a control circuit configured to cause the first variable resistor and the second variable resistor to each have a selected one of a first resistance level, a second resistance level, and a third resistance level based on an operating phase of the circuit, wherein the control circuit is further configured to:
      select the first resistance level during a first operating phase of the NFC device corresponding to a reader mode,
      select the second resistance level during a second operating phase of the NFC device corresponding to periods of transmission bursts of the antenna during a card emulation mode of the NFC device, and
      select the third resistance level during a third operating phase of the NFC device corresponding to part of a non-transmission period between transmission bursts of the antenna during the card emulation mode.

2. The circuit of claim 1, wherein the first variable resistor and the second variable resistor are configured such that the first resistance level causes the antenna to have a first resonant frequency, and wherein the second resistance level causes the antenna to have a second resonant frequency higher than the first resonant frequency.

3. The circuit of claim 2, wherein the first variable resistor and the second variable resistor are configured such that the first resonant frequency is less than 14 MHz and the second resonant frequency is greater than 14 MHz.

4. The circuit of claim 1, wherein the first variable resistor and the second variable resistor are configured such that the third resistance level causes damping of voltage oscillations of the antenna.

5. The circuit of claim 1, wherein:
   the first resistance level is less than 3 ohms;
   the second resistance level is greater than 3 ohms and less than 100 ohms; and
   the third resistance level is greater than 25 ohms and is different from the second resistance level.

6. The circuit of claim 1, wherein the control circuit is further configured to perform an automatic antenna tuning procedure to determine a value of a control signal for programming the first variable resistor and the second variable resistor to have the second resistance level.

7. The circuit of claim 6, wherein the control circuit is configured to determine the control signal by performing the operations of:
   selecting an initial value of the control signal to select an initial resistance level of the first variable resistor and the second variable resistor;
   detecting an amplitude and/or a phase of a signal present on the antenna during a transmission burst;
   comparing the amplitude with a reference amplitude and/or comparing the phase with a reference phase;
   modifying the initial value of the control signal to modify the initial resistance level based on the comparison; and
   repeating the operations of selecting, detecting, comparing, and modifying at least once.

8. An NFC device, comprising:
   an NFC antenna;
   an active load modulation (ALM) driving circuit coupled to the NFC antenna, wherein the ALM driving circuit comprises:
      a first variable resistor coupled to a first terminal of the NFC antenna via a first capacitor;
      a second variable resistor coupled to a second terminal of the NFC antenna via a second capacitor; and
      a control circuit configured to cause the first variable resistor and the second variable resistor to each have a selected one of a first resistance level, a second resistance level, and a third resistance level based on an operating phase of the circuit, wherein the control circuit is further configured to:
         select the first resistance level during a first operating phase of the NFC device corresponding to a reader mode,
         select the second resistance level during a second operating phase of the NFC device corresponding to periods of transmission bursts of the antenna during a card emulation mode of the NFC device, and
         select the third resistance level during a third operating phase of the NFC device corresponding to part of a non-transmission period between transmission bursts of the antenna during the card emulation mode; and
   a battery supplying a supply voltage to the ALM driving circuit.

9. The NFC device of claim 8, further comprising a host processing device in communication with the ALM driving circuit.

10. The NFC device of claim 8, wherein the control circuit is further configured to perform an automatic antenna tuning procedure to determine a value of a control signal for programming the first variable resistor and the second variable resistor to have the second resistance level.

11. The NFC device of claim 10, wherein the control circuit is configured to determine the control signal by performing the operations of:
   selecting an initial value of the control signal to select an initial resistance level of the first variable resistor and the second variable resistor;
   detecting an amplitude and/or a phase of a signal present on the NFC antenna during a transmission burst;
   comparing the amplitude with a reference amplitude and/or comparing the phase with a reference phase;

modifying the initial value of the control signal to modify the initial resistance level based on the comparison; and repeating the operations of selecting, detecting, comparing, and modifying at least once.

12. The NFC device of claim 8, wherein:

the first resistance level is less than 3 ohms;

the second resistance level is greater than 3 ohms and less than 100 ohms; and the third resistance level is greater than 25 ohms and is different from the second resistance level.

13. The NFC device of claim 8, wherein the first variable resistor and the second variable resistor are configured such that the first resistance level causes the NFC antenna to have a first resonant frequency, and wherein the second resistance level causes the NFC antenna to have a second resonant frequency higher than the first resonant frequency.

14. The NFC device of claim 13, wherein the first variable resistor and the second variable resistor are configured such that the first resonant frequency is less than 14 MHz and the second resonant frequency is greater than 14 MHz.

15. A method of driving an NFC antenna of an NFC device using an active load modulation driving circuit, the method comprising:

generating, by a control circuit, at least one control signal for programming a first variable resistor and a second variable resistor to each have one of a first resistance level, a second resistance level, and a third resistance level selected based on an operating phase of the NFC device, the first variable resistor being coupled to a first terminal of the NFC antenna via a first capacitor, the second variable resistor being coupled to a second terminal of the NFC antenna via a second capacitor, wherein the at least one control signal is generated in order to:

select the first resistance level during a first operating phase of the NFC device corresponding to a reader mode, select the second resistance level during a second operating phase of the NFC device corresponding to periods of transmission bursts of the NFC antenna during a card emulation mode of the NFC device, and select the third resistance level during a third operating phase of the NFC device corresponding to part of a non-transmission period between transmission bursts of the NFC antenna during the card emulation mode; and applying, by the control circuit, the at least one control signal to the first variable resistor and the second variable resistor.

16. The method of claim 15, further comprising performing an automatic antenna tuning procedure to determine a value of the at least one control signal for programming the first variable resistor and the second variable resistor to have the second resistance level.

17. The method of claim 16, wherein the automatic antenna tuning procedure comprises:

selecting, using an initial control signal value, an initial resistance level of the first variable resistor and the second variable resistor;

detecting an amplitude and/or a phase of a signal present on the NFC antenna during a transmission burst;

comparing the amplitude with a reference amplitude and/or comparing the phase with a reference phase;

modifying the initial control signal value to modify the initial resistance level based on the comparison; and repeating the operations of selecting, detecting, comparing, and modifying one or more times and storing the modified initial control signal value.

* * * * *